(12) United States Patent
Cordes et al.

(10) Patent No.: US 8,292,330 B2
(45) Date of Patent: Oct. 23, 2012

(54) INSERTABLE TUBE SYSTEM FOR A VACUUM CLEANER

(75) Inventors: Martin Cordes, Sundern (DE); Stephan Cordes, Arnsberg (DE)

(73) Assignee: Fischer Rohrtechnik GmbH, Achern-Fautenbach (DE)

( * ) Notice: Subject to any disclaimer, the term of this patent is extended or adjusted under 35 U.S.C. 154(b) by 200 days.

(21) Appl. No.: 12/780,037

(22) Filed: May 14, 2010

(65) Prior Publication Data

US 2010/0289255 A1 Nov. 18, 2010

(30) Foreign Application Priority Data

May 15, 2009 (DE) .......... 10 2009 021 595

(51) Int. Cl.
*A47L 9/24* (2006.01)

(52) U.S. Cl. .............. 285/7; 285/302; 285/320

(58) Field of Classification Search .............. 285/7, 302, 285/303, 317, 320; 15/414
See application file for complete search history.

(56) References Cited

U.S. PATENT DOCUMENTS

| | | | |
|---|---|---|---|
| 4,641,859 A * | 2/1987 | Walters | 285/27 |
| 6,341,804 B1 * | 1/2002 | Ito et al. | 285/81 |
| 6,345,408 B1 * | 2/2002 | Nagai et al. | 15/361 |
| 6,431,607 B1 * | 8/2002 | Kittelmann et al. | 285/7 |
| 6,832,784 B1 * | 12/2004 | Chen | 285/7 |
| 7,155,774 B2 * | 1/2007 | Jung | 15/414 |
| 7,494,161 B2 * | 2/2009 | Kanai et al. | 285/403 |
| 7,581,288 B2 * | 9/2009 | Zhang | 15/414 |
| 2002/0063427 A1 * | 5/2002 | Schiemann et al. | 285/316 |

FOREIGN PATENT DOCUMENTS

| | | |
|---|---|---|
| DE | 197 02 464 C1 | 5/1998 |
| DE | 202 12 280 U1 | 1/2003 |
| DE | 20 2004000425 U1 | 5/2004 |

* cited by examiner

*Primary Examiner* — James Hewitt
(74) *Attorney, Agent, or Firm* — Roberts Mlotkowski Safran & Cole, P.C.; David S. Safran

(57) ABSTRACT

An insertable tube system for a vacuum cleaner, with at least one first tube, a second tube and a coupling for detachable connection of the first tube to the second tube, the coupling having a guide element and a lever button, the guide element being located on the outside of the wall of the first tube, the lever button in the guide element being supported to be able to move around a pivot axis, the lever button being movable by the force of at least a first spring element into a catch position, and the lever button having a catch projection on the bottom, the wall of the first tube having an opening for the catch projection of the lever button, and a mechanical connection between the first tube and the second tube being producible by engagement of the catch projection with a catch recess of the second tube.

18 Claims, 3 Drawing Sheets

INSERTABLE TUBE SYSTEM FOR A VACUUM CLEANER

BACKGROUND OF THE INVENTION

1. Field of the Invention

The invention relates to an insertable tube system for a vacuum cleaner, with at least one first tube, a second tube and with a coupling for detachable connection of the first tube to the second tube, the coupling having a guide element and a lever button, the guide element being located on the outside of the wall of the first tube, the lever button in the guide element being supported to be able to move around a pivot axis, the lever button being movable by the force of at least a first spring element into a catch position, and the lever button on the bottom having a catch projection, and the wall of the first tube can be penetrated by an opening for the catch projection of the lever button, and a mechanical connection between the first tube and the second tube being producible by engagement of the catch projection with a catch recess of the second tube.

2. Description of Related Art

Insertable tube systems for vacuum cleaners are known with a plurality of couplings and catch mechanisms which make it possible to flexibly set the length of the tube system by telescoping of at least two tubes. One design version, for example, according to German Patent DE 197 02 464, calls for a catch element attached to the first outer tube to engage a catch means on the second inner tube, and thus, to block the displacement of the tubes relative to one another.

However, in addition to mechanical fixing of the tubes, dissipation of static voltages should also be ensured; they arise, for example, by the motion of the suction head on the ground or by the air flow. Voltages are conventionally dissipated by the suction head via the metallic tubes of the vacuum cleaner to the handle of the vacuum cleaner; dissipation takes place from the handle of the vacuum cleaner with a suitable means as far as the equipment grounding conductor of an electrical socket. In the prior art, electrical contact-making of the individual tubes among one another—for telescoping tube systems—and also contact-making of the last, upper tube with the handle, often takes place with elastic sliding contacts which are attached to the tube wall and produce an electrically conductive contact with another tube wall.

One major disadvantage of the method known from the prior art for dissipation of static voltages is that a plurality of additional parts for contact-making of the tubes among one another and contact-making of the last, upper tube with the handle must be produced and mounted.

SUMMARY OF THE INVENTION

Therefore, a primary object of this invention is to devise an insertable tube system for a vacuum cleaner which ensures reliable dissipation of induced charges within the tube system, but at the same time, which can be easily produced and mounted.

This object is achieved in accordance with the invention in an insertable tube system for vacuum cleaners of the initially named type by an electrically conductive connection being able to be established between the first tube and the second tube, at least in the catch position of the lever button with the first spring element. The spring element is produced from a conductive material and arranged such that when the second tube is inserted into the first tube and locked, an electrically conductive contact between the walls of the two tubes is produced. The spring element performs a dual function, on the one hand, it applies a reset force in order to move the lever button into its catch position, and on the other, at the same time, produces an electrically conductive contact in the tube system which ensures dissipation of induced charges, assuming the grounding of the tube system.

The dissipation of static voltages is only important in vacuum cleaner tubes which are made of a conductive metal, for example, a highly alloyed steel. Direct contact-making of the conductive tube wall is often not possible since the catch, insert and connecting means are conventionally made of plastic which insulates the individual tubes from one another. This contact can be re-established in accordance with the invention between the tube walls by way of the spring element. The insertable tube system in accordance with the invention has the advantage that it requires fewer parts than the insertable tube systems known from the prior art, since the function of two individual components, specifically that of the reset spring of the lever button and that of the elastic contact element, are now performed by one part, the first spring element.

In the normal state, the lever button is held by the first spring element in the catch position, the lever button being movable into a release position either by insertion of the second tube and the resulting pressure against the catch projection or by the actuation of the lever button against the force of the first spring element. In the release position, the first spring element causes a reset force in the direction of the catch position on the lever button. For the case in which the release position has been reached by the insertion of the second tube, resetting of the catch projection or of the lever button into the catch position by the first spring element takes place as soon as the catch recess is positioned underneath the catch projection. The engagement of the catch projection with the catch recess of the second tube fixes the two tubes relative to one another. By actuating the lever button against the force of the first spring element, the lever button can be moved again into the release position so that the catch projection is raised out of the catch recess of the second tube and movement of the first tube relative to the second tube is released.

The lever button is preferably made such that, in the middle, roughly at half of its length, there is a pivot axis, on one side of the pivot axis on the bottom of the lever button there being a catch projection, and on the other side of the pivot axis, the first spring element being positioned so that a seesaw motion of the lever button around the pivot axis against the spring force of the first spring element is possible. This configuration of the lever button enables simple fixing and locking of the catch projection in the catch recess of the second tube. Moreover, it has been found to be advantageous to provide the pivot axis of the lever button, not in the middle, but somewhat farther away from the catch projection so that the catch projection can be removed almost perpendicularly from the catch recess since, in this way, the pivot radius of the catch projection on the lever button is increased.

The first spring element acts with its spring force on the bottom of the lever button so that the lever button can be moved by the force of the first spring element into the catch position. In order to intensify the holding of the lever button in the catch position, and thus, for example, to ensure additional safety against unintentional release of the catch connection, according to a preferred configuration of the insertable tube system, it is provided that the coupling has a second spring element which, in addition to the first spring element, applies an equivalently acting force with which the lever button can be moved into the catch position. It has proven very advantageous if the second spring element is made in the form of a torsion bar spring which, at the same time, constitutes the pivot axis of the lever button over its lengthwise extension so that, when the lever button is moved into the release position, the torsion bar spring is twisted by the pivoting of the lever button, by which a reset force acts on the lever button which moves it from the release position into the catch position. In addition to the torsion bar spring, in the release position, in addition, the first spring element also acts on the bottom of the lever button so that the two springs at the same time apply a reset force to the lever button into the catch position. Reliable and safe locking of the catch projection in the recess of the second tube is ensured by the force of the two springs.

Moreover, it is especially preferred that the guide element, the lever button and the second spring element are made in one piece. In this case "in one piece" means that the three elements are combined into one part, and for example, are produced cohesively in an injection molding process so that the lever button is connected to the guide element via the second spring element—the torsion bar spring. The torsion bar spring is made of the same material as the lever button, and the guide element is securely connected to these parts. The basic shape of the guide element is oval, rectangular, round or provided with rounded edges, the side flanks of the guide element preferably being pivoted relative to one another, by which the installation space can be reduced.

In the released state of the second spring element—the torsion bar spring—the top of the lever button is on the same level with the frame or the flanks of the guide element. The formation of a spring force by the torsion bar spring takes place by deflecting the lever button out of this position—the catch position—into the release position.

The guide element with the lever button is attached to the wall of the first tube. So that fixing of the two tubes can take place relative to one another, the catch projection of the lever button extends through the first tube through an opening in the wall. According to a preferred configuration, it is now provided that the first spring element also passes through the wall of the first tube in this same opening. The first spring element passes through the wall in order to apply a spring force on the two sides of the wall, but at the same time to produce an electrically conductive connection between the outer, first tube and the inner, second tube. But it is also provided that the catch projection and the first spring element penetrate the wall of the first tube not only in a common opening, but penetrate the wall of the tube preferably in several common openings. Alternatively to one or more openings which are penetrated by the first spring element and the catch projection, it is also provided that the first spring element passes through the wall in a first opening and the second spring element passes through the wall of the first tube in a second opening.

The insertable tube system in accordance with the invention in preferred configurations calls for two versions of the first spring element. According to a first advantageous version of the insertable tube system the second, inner tube forms a first abutment for the first spring element and the bottom of the lever button forms a second abutment for the first spring element. A spring force consequently arises between the bottom of the lever button and the wall of the second tube. The spring is made such that it is supported on the bottom of the lever button, passes through the wall of the first tube and is elastically supported on the other side of the tube wall on the wall of the second tube. In this state, the first spring element has slight pretensioning since the lever button is in the catch position. If, at this point, the lever button is moved out of the catch position into the release position, the lever button is pressed down on the side of the first spring element so that the spring is compressed between the bottom of the lever button and the wall of the second tube and the spring force increases, by which a reset force into the catch position is produced. If a second tube is not inserted into the first tube, the first spring element in this version is free of tension.

The first spring element, according to one advantageous configuration, is pivotally held within the opening through which the first spring element penetrates the wall of the first tube. The wall of the second tube and the bottom of the lever button limit the three dimensional mobility of the first spring element, from which two opposing forces result. The opposing forces act on the lever arms of the spring element, so that two opposing moments are produced. The opposing moments cause compression of the spring since the spring cannot avoid the moments. The spring element is supported to be able to pivot in the opening, but cannot move in the opening such that the moments are reduced in this way. Compression of the spring element produces a spring force which opposes the forces which generate moments, so that the first spring element consequently presses against the wall of the first tube and against the bottom of the lever button.

Another version of the insertable tube system calls for the first spring element to be made such that the wall of the first tube constitutes a central abutment for the first spring element. With the first spring element two separate spring forces are produced, on the one hand, between the bottom of the lever button and the wall of the first tube, and on the other, between the outside of the wall of the second tube and the wall of the first tube. In both cases, the spring force is formed by compression of the first spring element against the wall of the first tube. Although two separate spring forces can be produced by the first spring element in this case, nevertheless, an electrically conductive connection between the first tube and the second tube is produced by the first element, in this case, also reaching through the wall of the first tube. The major difference is that the spring element is attached to the wall of the first tube in a positive, bonded or nonpositive manner or is supported on it from two sides.

According to a preferred configuration of the insertable tube system, it is provided that the second tube has a single catch recess and at least one electrically conductive partial region. The first and the second tube can be fixed with one another only in one position by a single catch recess, for example, such that the second tube is inserted into the first tube only in a short partial region. The electrically conductive partial region is important especially for making contact with the electrically conductive first spring element, the electrically conductive partial region being grounded so that an electrically conductive connection of the first tube to the grounded electrically conductive partial region of the second tube can be produced by the first spring element.

An electrically conductive partial region is especially important when the second tube is the handle of the vacuum cleaner which is made, for example, of plastic. The electrically conductive partial or contact region on the handle of the vacuum cleaner which is made of plastic is made, for example, in the form of a metal plate, a metal bar or otherwise. It is important that this electrically conductive partial region has a connection to ground, for example, a connection to the equipment grounding conductor of an electrical receptacle. Moreover, the electrically conductive partial region is made and located in the handle of the vacuum cleaner such that the user of the vacuum cleaner in conventional use of the handle with at least one hand is in contact with the electrically conductive partial region or is connected to the electrically conductive partial region by way of an electrically conductive material. If there is a handle of the vacuum cleaner completely of electrically conductive material, the entire handle makes contact with the equipment grounding conductor so that the electrically conductive partial region can be omitted.

For the case in which the first and second tube are to be movable-telescopable-relative to one another, according to another configuration of the insertable tube system, it is provided that the second tube has a plurality of catch recesses, and the catch projection of the first tube can engage any of these catch recesses, by which fixing of the two tubes relative to one another in the respective position takes place. The first and the second tube are made such that they can be pushed into one another and are preferably also guided in a locked manner. In order to optimally reduce the suction losses by the entry of secondary air into the insertable tube system, it is preferably provided that the catch recesses of the second tube are free of openings and constitute only one depression or offset relative to the remainder of the tube wall. The edges of the offsets, however, must have a correspondingly sharp contour so that the catch projection can, for example, lock positively and slippage of the catch projection does not occur over, for example, a rounded edge. The catch recess can be produced, for example, by deep drawing.

The goal of this invention is to reliably ensure dissipation of static voltages or induced charges in an insertable tube system for vacuum cleaners and to simplify its production.

This goal is achieved according to another version of the insertable tube system of the initially named type in that an electrically conductive connection between the first and the second tube can be produced by way of the catch projection. The catch projection, as already explained, passes through the wall of the first tube in order to produce a mechanical connection to the second tube. Here, the catch projection is in contact with the wall of the first tube and the wall of the second tube in the region of the catch recess and is at least partially electrically conductive. The catch projection which is necessary anyway in this version additionally assumes the tasks of the contact element for producing the electrically conductive connection between the two tubes, by which one component becomes unnecessary and production is simplified.

It has been found to be very advantageous according to a preferred configuration of the insertable tube system if a contact cap of electrically conductive material is placed on the catch projection so that electrically conductive contact is produced by way of the contact cap. Thus, the contact cap in the region of the wall of the first tube for example, has a contact edge which adjoins the wall of the first tube, the contact cap on the bottom being in contact with the wall of the second tube. Here it has been found to be especially advantageous if the catch recess of the second tube is free of openings so that simple electrical contact-making of the contact cap on the catch projection with the region of the catch recess of the second tube can take place. It is also preferably provided that the catch projection itself is produced from an electrically conductive material and is attached to the lever button in a bonded, nonpositive or positive manner.

There should be an electrically conductive connection especially in the catch position of the lever button. So that this connection is always ensured, according to one advantageous configuration, it is provided that the contact cap is elastically supported on the catch projection so that an electrically conductive connection is ensured even when there is play in the coupling. For this purpose, for example, there is a compression spring within the catch projection which movably positions the contact cap on the bottom of the catch projection. Furthermore, it is also provided that the contact cap itself has spring-like partial regions so that the contact cap flexibly equalizes possible play and ensures that continuous electrical contact is made. The insertable tube system, with the catch projection as an electrically conductive connection between the two tubes, can be provided with the same advantageous features which have already been explained for the insertable tube system with the first spring element as an electrically conductive connection.

In particular, there is now a plurality of possibilities for embodying and developing the insertable tube system in accordance with the invention for a vacuum cleaner. In this respect reference is made to the following description of preferred exemplary embodiments in conjunction with the accompanying drawings.

DETAILED DESCRIPTION OF THE INVENTION

Figure 1:
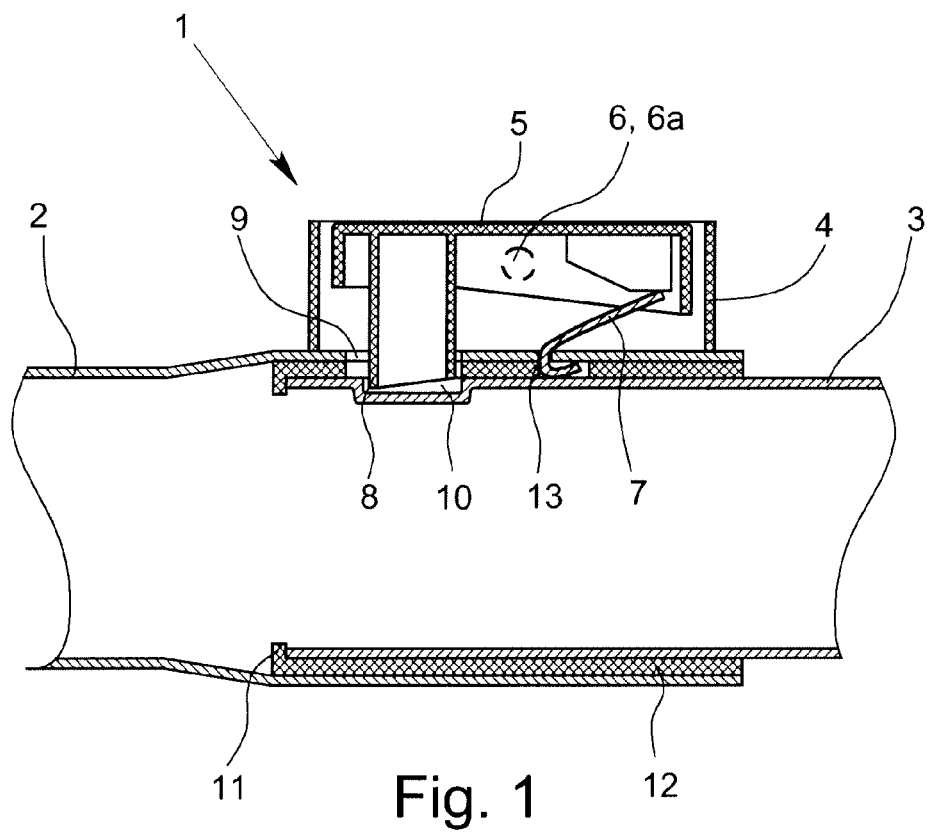
FIG. 1 shows an exemplary embodiment of the insertable tube system in accordance with the invention for a vacuum cleaner.

FIG. 1 shows one exemplary embodiment of the insertable tube system 1 for a vacuum cleaner, for producing a connection between a first tube 2 and a second tube 3. The connection is produced with a coupling which has a guide element 4 and a lever button 5, the guide element 4 being located and attached on the outside of the wall of the first tube 2. The lever button 5 is supported in the guide element 4 to be able to move around a pivot axis 6. In this exemplary embodiment, the pivot axis 6 formed by a torsion bar spring 6a. The lever button 5 can be moved into the catch position by the force of the torsion bar spring 6a, and additionally, by the force of the first spring element 7.

On the bottom, the lever button 5—in FIG. 1 on the right side of the pivot axis 6—is in contact with the first spring element 7. On the other side of the pivot axis 6, the lever button 5 has a catch projection 8 on the bottom. The catch projection 8 extends through the wall of the first tube 2 in an opening 9, and on the other side of the wall, engages a catch recess 10 of the second tube 3. Engagement of the catch projection 8 with the catch recess 10 of the second tube 3 produces a positive connection between the first tube 2 and the second tube 3. Because the guide element 4 is attached to the first tube 2 and the catch projection 8 positively engages the catch recess 10, relative motion of the first tube 2 to the second tube 3 is blocked in the catch position. The catch projection 8 is beveled on the bottom in the lengthwise direction of the first tube 2, so that the removal of the catch projection from the catch recess 10 is simplified and thus blocking in the release position is prevented. The lever button 5, the torsion bar spring 6a and the guide element 4, in this version, are produced in one piece and thus are joined to one another.

FIG. 1 shows the lever button 5 in the catch position, the catch projection 8 and the catch recess 10 producing a positive connection between the first tube 2 and the second tube 3.

The second tube 3 is additionally fixed against the stop edge 11 of a plastic sleeve 12 located within the first tube 2. The second tube 3, in this embodiment, is the handle of a vacuum cleaner which is made of electrically conductive material so that an electrically conductive partial region in the area of the first spring element 7 is unnecessary.

The first spring element 7, in the catch position shown in FIG. 1, is slightly pretensioned by the first spring element 7 being compressed between the wall of the second tube 3 and the bottom of the lever button 5. The first spring element 7 is made of an electrically conductive material and establishes an electrically conductive connection between the first tube 2 and the second tube 3. In this exemplary embodiment, the bottom of the lever button 5 represents a first abutment and the wall of the second tube 3 a second abutment for the first spring element 7.

Figure 2:
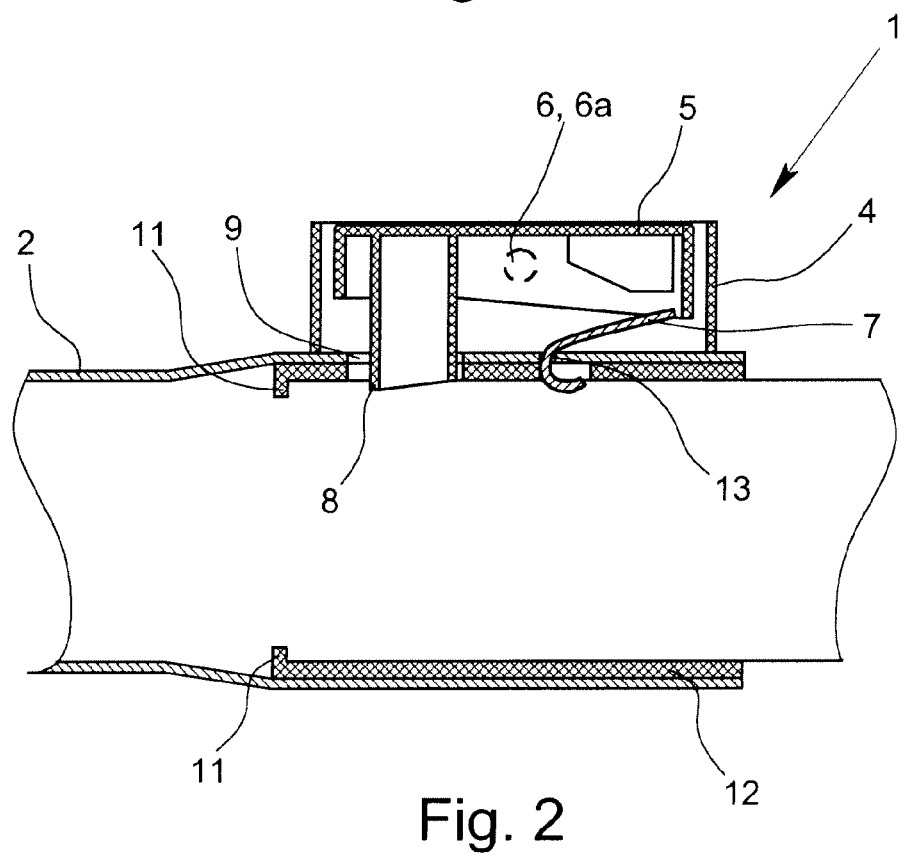
FIG. 2 shows the exemplary embodiment of the insertable tube system as shown in FIG. 1 without a second tube.

FIG. 2 shows the exemplary embodiment as shown in FIG. 1, but without the second tube 3. Because the second tube 3 is not inserted into the first tube 2, the first spring element 7 is unloaded and can move within the opening 13. FIG. 2 shows that the spring element does not adjoin the bottom of the lever button 5 and has a half-round projection at its lower region that extends into the flow cross section of the first tube 2. By inserting the second tube 3 into the first tube 2, the second tube 3 will press the spring element 7 up, by which the spring element 7 will be compressed between the wall of the second tube 3 and the bottom of the lever button 5. A force which would move the lever button 5 into the catch position would result from this compression of the spring element 7. The lower part of the spring element 7 is such that it does not project the half-round portion too far into the flow cross section so that the second tube 3 does not jam on the spring element 7 when inserted into the first tube 2.

By inserting—in the position shown in FIG. 2—the second tube 3 into the first tube 2, on the one hand, the spring element 7 will be pressed against the bottom of the lever button 5, on the other hand, the second tube 3 would also first press the catch projection 8 out of the flow cross section of the first tube 2, as a result of which the spring element 7 will be additionally compressed and the torsion bar spring 6a will be twisted. As soon as the catch recesses 10 are positioned underneath the catch projection 8, the spring forces of the torsion bar spring 6a and of the spring element 7 will move the catch projection 8 into the catch recess 10, and thus, the lever button 5 into the catch position. The exemplary embodiment shown in FIGS. 1 & 2 has two openings 9 in the wall of the first tube 2, the openings 2 for the catch projection 8, and the opening 13 for the first spring element 7.

Figure 3:
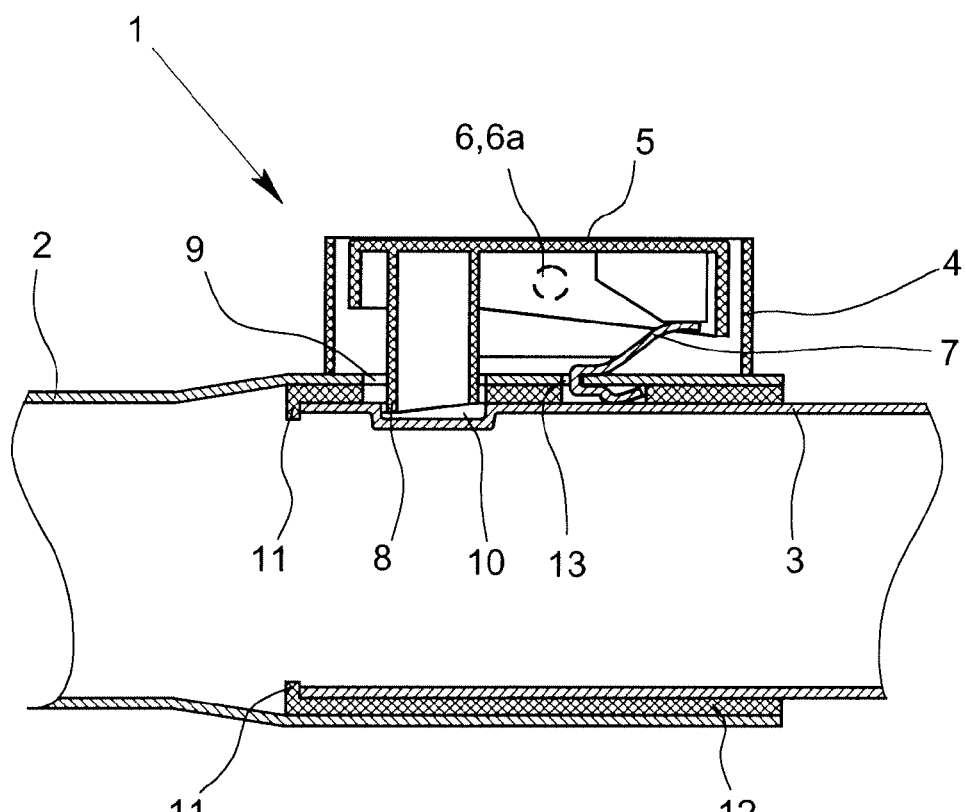
FIG. 3 shows a second exemplary embodiment of the insertable tube system in accordance with the invention for a vacuum cleaner.

FIG. 3 shows an exemplary embodiment of an insertable tube system 1 for a vacuum cleaner, the functionality of the lever button 5 accordingly corresponding to that already described for FIGS. 1 & 2. The exemplary embodiment as shown in FIG. 3 differs from those as shown in FIGS. 1 & 2 in that, not only can a spring force be simply produced by the first spring element 7—as in the exemplary embodiment as shown in FIGS. 1 & 2—but two spring forces which are separate from one another can be produced. For this purpose, the first spring element 7 in the region of the opening 13 is supported on the wall of the first tube 2 so that a first spring force arises between the bottom of the lever button 5 and the wall of the first tube 2 and a second spring force arises between the wall of the second tube 3 and the wall of the first tube 2. As shown in FIG. 3, the spring element 7 is positively attached to the wall of the first tube 2 by the spring element 7 encompassing the wall of the first tube 2 through the opening 13 by being clipped on to the wall. The spring element 7 thus performs the same functions as the spring element 7 according to the exemplary embodiment of FIGS. 1 & 2 with the difference that the first spring element 7 cannot move freely when the second tube 3 has not been inserted.

Figure 4:
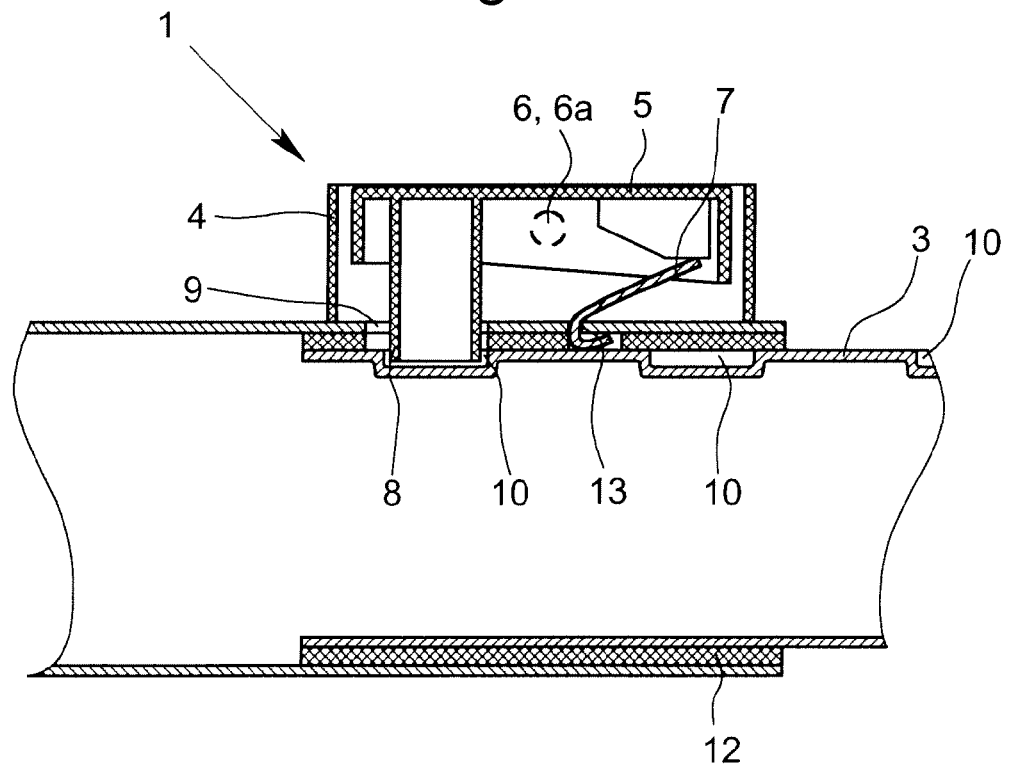
FIG. 4 shows a third exemplary embodiment of the insertable tube system for a vacuum cleaner, with a telescoping second tube.

FIG. 4 shows an exemplary embodiment of an insertable tube system 1 for a vacuum cleaner in which the first tube 2 can be telescoped to the second tube 3 in that the catch projection 8 can engage a plurality of catch recesses 10 of the second tube 3. So that the second tube 3 can be moved within the first tube 2, the plastic sleeve 12 does not have a stop edge 11. Furthermore, the first tube 2 is made without a taper. Depending on which catch recess 10 is engaged by the catch projection 8 of the lever button 5, the position of the first tube 2 relative to the second tube 3, and thus, the length of the insertable tube system 1 can be adjusted. In this exemplary embodiment, an electrically conductive connection is also established by the spring element 7 between the wall of the first tube 2 and the wall of the second tube 3.

Figure 5:
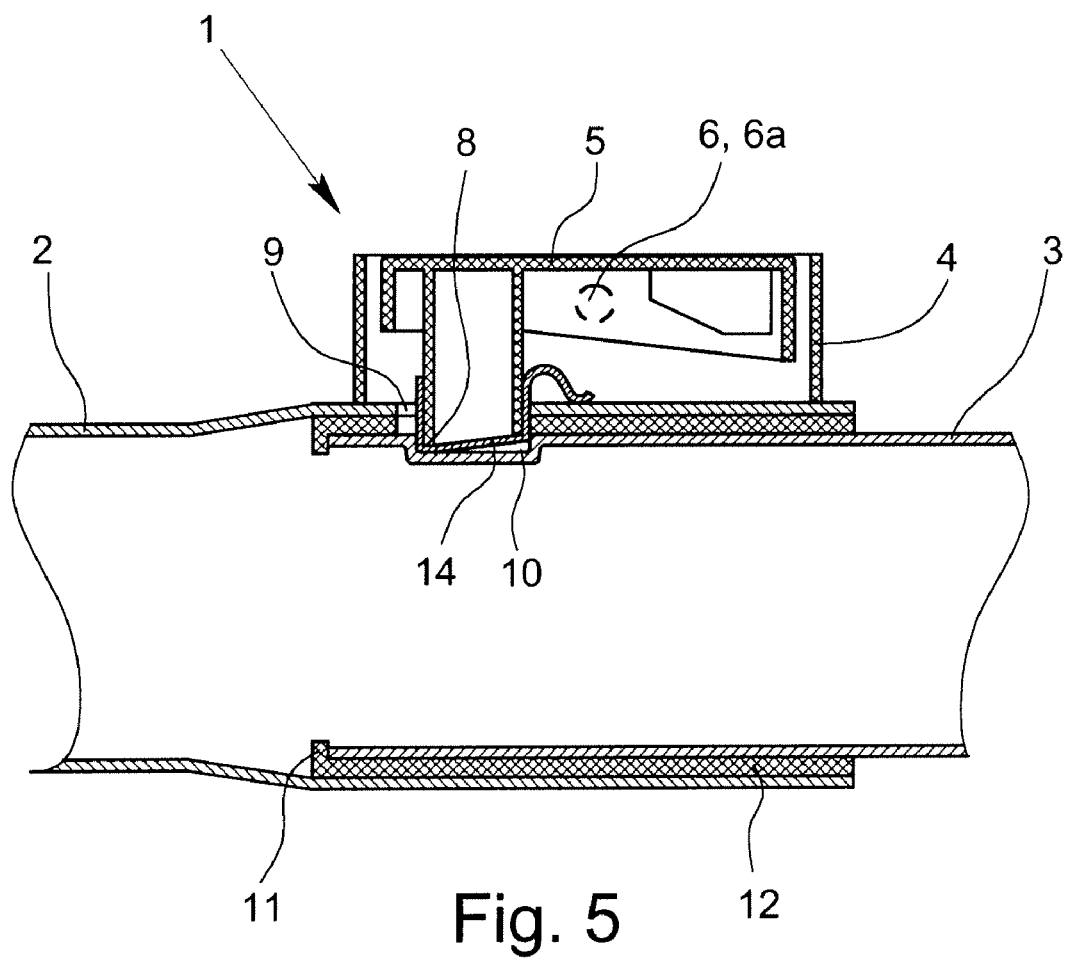
FIG. 5 shows another exemplary embodiment of the insertable tube system for a vacuum cleaner, with a catch projection as the electrically conductive connecting element.

FIG. 5 shows another preferred exemplary embodiment of the insertable tube system 1 for a vacuum cleaner with a catch projection 8 as an electrically conductive connecting element. The catch projection 8 of the lever button 5 in this exemplary embodiment is provided with a contact cap 14. The contact cap 14 is made of an electrically conductive material and in the illustrated catch position is in contact in the upper region with the wall of the first tube 2 and in the lower region with the catch recess 10, and thus, also with the wall of the second tube 3. The catch recess 10 is free of openings. The contact cap 14 establishes an electrically conductive connection between the wall of the first tube 2 and the wall of the second tube 3. In the region of the wall of the first tube 2, the contact cap 14 is made flexible so that continuous contact-making with the wall of the first tube 2 is ensured. The torsion bar spring 6a in this embodiment constitutes the only spring element with which a resetting force in the direction of the catch position can be applied to the lever button 5.

Of course all described exemplary embodiments are only schematic sketches so that the required mobility of individual parts, especially of the lever button, is not blocked by other parts in the actual execution, if not explicitly required.

What is claimed is:

1. Insertable tube system for a vacuum cleaner, comprising:
    at least one first tube,
    a second tube and
    a coupling for detachable connection of the first tube to the second tube, the coupling having a guide element and a lever button, the guide element being located on an outer side of a wall of the first tube, the lever button being supported in the guide element to be able to move around a pivot axis, the lever button being movable by the force of at least a first spring element into a catch position, and the bottom of the lever button having a catch projection, and the wall of the first tube being penetrated by an opening for the catch projection of the lever button, and a mechanical connection between the first tube and the second tube being producible by engagement of the catch projection with a catch recess of the second tube,
    wherein an electrically conductive connection between the first tube and the second tube is produced with the first spring element in at least a catch position of the lever button; and
    wherein the catch projection of the lever button and the first spring element penetrate the wall of the first tube in the catch position via respective separate openings.

2. Insertable tube system for a vacuum cleaner in accordance with claim 1, wherein the lever button is movable into a release position by actuating the lever button against the force of at least the first spring element, the catch projection of the lever button in the release position being released so as to permit movement of the first tube relative to the second tube, the pivot axis of the lever button being provided roughly at half a lengthwise extension of the lever button, the first spring element being located on one side of the lever button and the catch projection being located on the other side of the lever button.

3. Insertable tube system for a vacuum cleaner in accordance with claim 1, wherein the coupling has a second spring element, the second spring element being a torsion bar spring which acts on the lever button in a direction into the catch position and at the same time constitutes the pivot axis of the lever button.

4. Insertable tube system for a vacuum cleaner in accordance with claim 1, wherein the wall of the first tube constitutes an abutment for the first spring element so that a first spring force is producible between the first tube and the bottom of the lever button and a second spring force is producible between the first tube and the outer side of the wall of the second tube.

5. Insertable tube system for a vacuum cleaner in accordance with claim 1, wherein the second tube has a single catch recess and at least one electrically conductive partial region, at least the electrically conductive partial region being grounded.

6. Insertable tube system for a vacuum cleaner in accordance with claim 1, wherein the second tube has a plurality of catch recesses spaced from each other in a lengthwise direction of the second tube and wherein the relative position of the tubes can be fixed by selective engagement of the catch projection with any of the catch recesses of the second tube.

7. Insertable tube system for a vacuum cleaner in accordance with claim 1, wherein the second tube is the handle of the vacuum cleaner.

8. Insertable tube system for a vacuum cleaner, comprising:
    at least one first tube,
    a second tube and
    a coupling for detachable connection of the first tube to the second tube, the coupling having a guide element and a lever button, the guide element being located on an outer side of a wall of the first tube, the lever button being supported in the guide element to be able to move around a pivot axis, the lever button being movable by the force of at least a first spring element into a catch position, and the bottom of the lever button having a catch projection, and the wall of the first tube being penetrated by an opening for the catch projection of the lever button, and a mechanical connection between the first tube and the second tube being producible by engagement of the catch projection with a catch recess of the second tube,
    wherein an electrically conductive connection between the first tube and the second tube is produced with the first spring element in at least a catch position of the lever button;
    wherein the coupling has a second spring element, the second spring element being a torsion bar spring which acts on the lever button in a direction into the catch position and at the same time constitutes the pivot axis of the lever button; and
    wherein the guide element, the lever button and the second spring element are made in one piece, the lever button being connected to the guide element via the second spring element.

9. Insertable tube system for a vacuum cleaner in accordance with claim 8, wherein the catch projection of the lever button and the first spring element penetrate the wall of the first tube in at least one common opening in the catch position.

10. Insertable tube system for a vacuum cleaner in accordance with claim 8, wherein the wall of the first tube constitutes an abutment for the first spring element so that a first spring force is producible between the first tube and the bottom of the lever button and a second spring force is producible between the first tube and the outer side of the wall of the second tube.

11. Insertable tube system for a vacuum cleaner in accordance with claim 8, wherein the second tube has a single catch recess and at least one electrically conductive partial region, at least the electrically conductive partial region being grounded.

12. Insertable tube system for a vacuum cleaner in accordance with claim 8, wherein the second tube is the handle of the vacuum cleaner.

13. Insertable tube system for a vacuum cleaner, comprising:
    at least one first tube,
    a second tube and
    a coupling for detachable connection of the first tube to the second tube, the coupling having a guide element and a lever button, the guide element being located on an outer side of a wall of the first tube, the lever button being supported in the guide element to be able to move around a pivot axis, the lever button being movable by the force of at least a first spring element into a catch position, and the bottom of the lever button having a catch projection, and the wall of the first tube being penetrated by an opening for the catch projection of the lever button, and a mechanical connection between the first tube and the second tube being producible by engagement of the catch projection with a catch recess of the second tube,
    wherein an electrically conductive connection between the first tube and the second tube is produced with the first spring element in at least a catch position of the lever button; and
    wherein the second tube forms a first abutment for the first spring element and the bottom of the lever button forms a second abutment for the first spring element so that the first spring element produces a spring force between the outside of the wall of the second tube and the bottom of the lever button in the catch position.

14. Insertable tube system for a vacuum cleaner in accordance with claim 13, wherein the second tube has a single catch recess and at least one electrically conductive partial region, at least the electrically conductive partial region being grounded.

15. Insertable tube system for a vacuum cleaner in accordance with claim 13, wherein the second tube is the handle of the vacuum cleaner.

16. Insertable tube system for a vacuum cleaner, comprising:
    at least one first tube,
    a second tube and
    a coupling for detachable connection of the first tube to the second tube, the coupling having a guide element and a lever button, the guide element being located on an outer side of a wall of the first tube, the lever button being supported in the guide element to be able to move around a pivot axis, the lever button being movable by the force of at least a first spring element into a catch position, and the bottom of the lever button having a catch projection, and the wall of the first tube being penetrated by an opening for the catch projection of the lever button, and a mechanical connection between the first tube and the second tube being producible by engagement of the catch projection with a catch recess of the second tube, wherein an electrically conductive connection between the first tube and the second tube is produced with the first spring element in at least a catch position of the lever button; and wherein the first spring element is pivotally held in the opening by opposing moment forces applied by means of the lever button and the wall of the second tube, compression of the spring element being caused by the moments.

17. Insertable tube system for a vacuum cleaner in accordance with claim 16, wherein the second tube has a single catch recess and at least one electrically conductive partial region, at least the electrically conductive partial region being grounded.

18. Insertable tube system for a vacuum cleaner in accordance with claim 16, wherein the second tube is the handle of the vacuum cleaner.

\* \* \* \* \*